United States Patent [19]

Hartmannsgruber

[11] 4,361,004
[45] Nov. 30, 1982

[54] BEARING SUPPORT FOR BOBBIN-SPINDLE DRIVE

[75] Inventor: Max Hartmannsgruber, Kirchheim, Fed. Rep. of Germany

[73] Assignee: Zinser Textilmaschinen GmbH, Ebersbach/Fils, Fed. Rep. of Germany

[21] Appl. No.: 213,624

[22] Filed: Dec. 5, 1980

[30] Foreign Application Priority Data

Dec. 14, 1979 [DE] Fed. Rep. of Germany ....... 2950394

[51] Int. Cl.³ .................... D01H 1/244; D01H 7/08
[52] U.S. Cl. ........................... 57/100; 57/129; 57/133
[58] Field of Search ................. 57/100, 133, 134, 129

[56] References Cited

U.S. PATENT DOCUMENTS

| | | | |
|---|---|---|---|
| 1,452,180 | 4/1923 | Brunner | 57/133 |
| 1,474,490 | 11/1923 | Perkins | 57/133 |
| 1,515,161 | 11/1924 | Mueller | 57/133 |
| 1,813,611 | 7/1931 | Dickie et al. | 57/100 X |
| 2,474,210 | 6/1949 | Abbott | 57/100 |
| 2,571,267 | 10/1951 | Ljunggren | 57/100 |
| 2,952,966 | 9/1960 | Serra | 57/134 |
| 3,095,687 | 7/1963 | Beerli | 57/100 |

*Primary Examiner*—John Petrakes
*Attorney, Agent, or Firm*—Karl F. Ross

[57] ABSTRACT

A bobbin drive has a support whose upper and a lower wall contain a motor with upper and lower shaft portions projecting through these upper and lower walls. A bobbin-support spindle is fixed on the upright shaft above the upper wall. A lower journal partly immersed in a lower body of oil carried in a lower sump rotationally supports the lower shaft portion adjacent the lower wall. An upper roller or ball bearing rotationally supports the upper shaft portion adjacent the upper wall and is lubricated from an upper oil reservoir provided immediately therebelow.

5 Claims, 2 Drawing Figures

BEARING SUPPORT FOR BOBBIN-SPINDLE DRIVE

FIELD OF THE INVENTION

My present invention relates to a bobbin-spindle drive. More particularly this invention concerns a bearing support system for such a drive.

BACKGROUND OF THE INVENTION

In a bobbin-spindle drive of the type described in commonly owned U.S. application Ser. No. 164,530, filed July 2, 1980 by H. Wolf, a bobbin-support spindle is carried directly on the shaft of an electric motor which in turn is mounted directly in a support beam. The motor shaft extends upwardly and downwardly out of the motor and is normally supported above and below the motor in the upper and lower walls of the support beam by bearings. Such heavy-duty mounting is necessary because the bobbin spindle carried on the motor shaft is subjected to considerable lateral deflection and is rotated at extremely high speed, sometimes in the neighborhood of 20,000 revolutions per minute (RPM).

The main problem withh the bearings of such an arrangement is keeping them lubricated. The rotor acts centrifugally to throw any oil between the bearings radially outward, so that oil transmission along the shaft is virtually impossible. Thus it is a standard occurrence for the upper bearing to dry out and, hence, burn out. Such a failure creates a nasty service problem for the operator of the machine and can even entail shutting down an entire section of a multiple-bobbin twisting or spinning machine of the type described in the above-identified application.

OBJECTS OF THE INVENTION

It is therefore an object of the present invention to provide an improved bobbin drive.

Another object of this invention is to provide an improved bearing arrangement for supporting the rotating parts of a bobbin-drive system.

SUMMARY OF THE INVENTION

These objects are attained according to the instant invention in a bobbin drive of the above-described general type wherein a lower journal rotationally supports the lower shaft portion of the motor shaft adjacent the lower wall of its housing. An oil sump is provided adjacent this lower journal and contains a lower body of oil in which the lower journal is at least partially submerged. An upper bearing rotationally supports the upper portion of the motor shaft adjacent the upper wall of its housing while an oil reservoir just below this upper bearing contains an upper body of oil and opens directly, through a short, substantially vertical passage, into an annular gap between an outer and an inner bearing race occupied by a set of rotary bodies such as rollers or balls.

According to further features of this invention I design this upper reservoir as an upwardly open U-section ring surrounding the upper shaft portion and provided internally with a felt ring saturated with the upper body of oil. The vertical passage extending between the saturated felt ring and the overlying bearing may be provided with an oil-permeable substance serving to conduct the lubricant from the reservoir to the bearing gap. The liquid lubricant, namely oil, is conducted either by capillary here termed "0.1," is conducted either by capillary action through that mass or by normal surface tension along the passage to the upper bearing. Such a system ensures that the upper bearing will have an extremely long life. Within its reservoir, which is preferably designed as a circular pan of a diameter exceeding that of the outer bearing race, the felt ring extends radially beyond that race under an upper wall portion of the motor housing which has a fill hole for the addition of oil.

In accordance with yet another feature of this invention the oil or lubricant sump at the bottom of the drive acts as a recipient for any lubricant that leaks out of the upper reservoir or the drums along the motor shaft. This sump is provided with means for viewing the oil level inside it, so that the operator can readily determine when extra oil should be added to the system. Such extra oil can normally be simply filled into the top reservoir, ensuring complete saturation of its felt ring, and thence overflow down into the sump. An overflow plug can be provided at the lower region of the motor housing to allow excess lubricant to be drained off.

SPECIFIC DESCRIPTION

Figure 2:
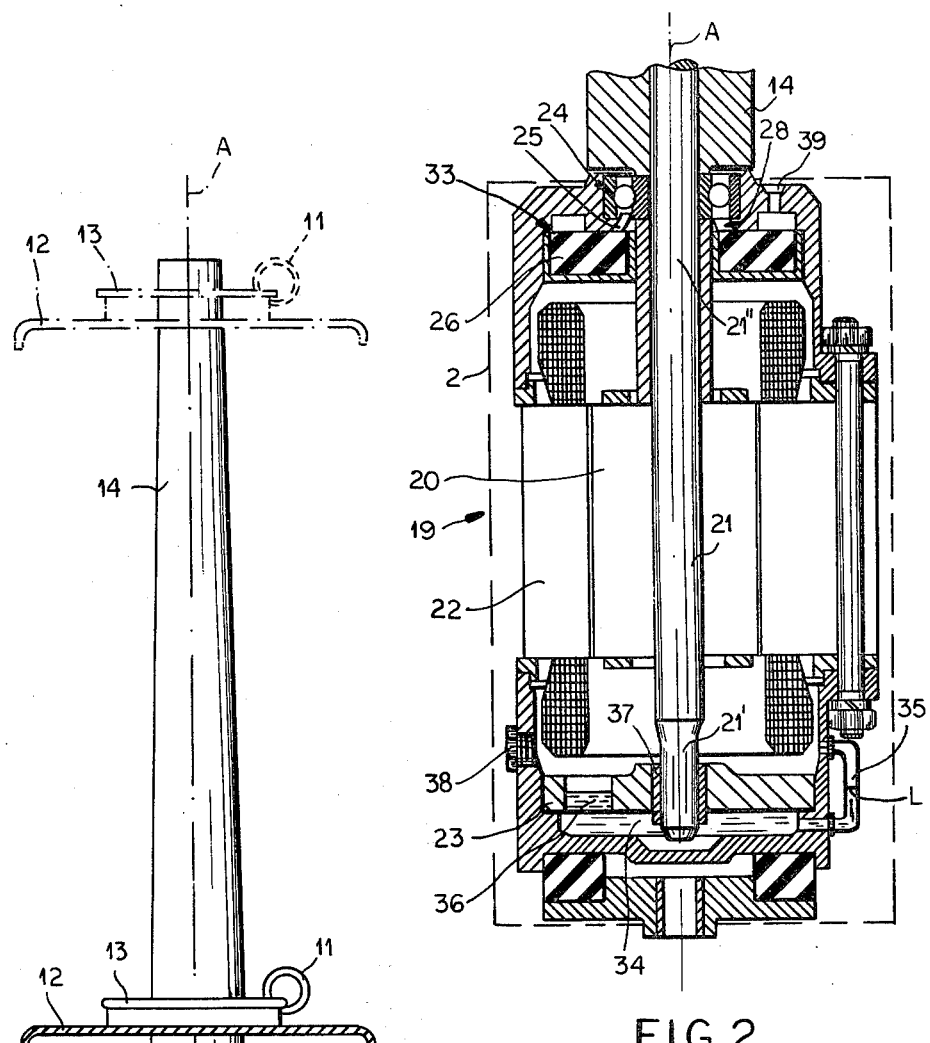
FIG. 2 is an axial section through a portion of the arrangement shown in FIG. 1.
Figure 1:
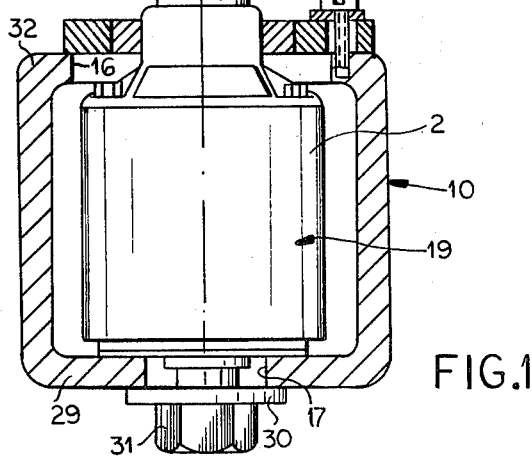
FIG. 1 is a partly sectional side view of the arrangement according to this invention.

As shown in the drawing, a support beam 10 of a multiple spinning or twisting machine is horizontally elongated and of square cross-section. The beam has an upper wall 32 and a lower wall 29 formed respectively with vertically throughgoing openings 16 and 17. An electrical motor 19 is received between these walls 29 and 32 and has a housing 2 locked in place at its lower end by a nut 31 and a washer 30. This motor has a shaft 21 (FIG. 2) extending at its upper end into a spindle 14 of upwardly tapering shape and passing axially upward through a traveler ring 13 carried on a support member 12 and engaged by a traveler 11 rotatable about the axis A of the assembly on the ring 13. The support member 12 is reciprocated vertically along the length of the spindle 14 in a manner described in the above-cited copending patent application. In this manner a yarn passing through the traveler 11 is wound around a core fitted over the spindle 14.

As best seen in FIG. 2, the motor shaft 21 carries the rotor 20 of the motor 19 which is coaxially received within the stator 22 of the motor, the latter being fixed in the housing 2. The electrical connections are standard. This shaft 21 is of reduced diameter at its lower end 21' and is fitted into a journal 37 carried on a plate 23 extending perpendicular to the axis A across the lower portion of the housing 2, this plate having a throughgoing hole 36. The lower portion of the housing 2 forms a reservoir or sump 34 filled to a level L with a liquid lubricant, here oil. A sight glass 35 provided on one side of the housing 2 allows this level L to be viewed from outside, and a drain plug 38 provided on the opposite side of the housing can be removed to drain off the oil when it rises to a level high enough to touch the stator 22.

The shaft 21 has an upper portion 21" fitted to the inside race of a ball bearing 24 whose outer race is fixed in the housing 2. Beneath this ball bearing 24 there is provided a reservoir 33 constituted by an upwardly open U-section ring or annular pan surrounding the shaft portion 21" and containing a rectangular-section felt ring 26. Passages 28, which may be provided with wicks 25 serving as the aforementioned oil-permeable substance, extend upwardly from the ring 26 to the bearing 24. The ring 26 is saturated with oil so that the bearing 24 remains lubricated.

The housing 2 is formed at its upper side with a fill hole 39 by means of which oil can be introduced into the upper reservoir 33. Normally it is merely necessary to periodically introduce a substantial charge of oil into this upper reservoir 33 so as to saturate the filter ring 26 and even cause its U-section ring to overflow. Any overflowing oil will run down through the motor and into the lower sump 34, providing lubrication for the journal 37. Thus the entire arrangement can be lubricated in an extremely easy manner and can therefore be counted on to have a relatively long service life. Even at the high operation speeds of such bobbin drives, frequently up to 20,000 RPM, the lubrication will be adequate.

I claim:
1. A bobbin drive comprising:
   a housing having an upper wall and a lower wall;
   a motor in said housing provided with a rotor between an upper shaft portion projecting upwardly through said upper wall and a lower shaft portion projecting downwardly toward said lower wall;
   a bobbin-support spindle fixed on said upper shaft portion above said upper wall;
   a journal rotationally supporting said lower shaft portion adjacent said lower wall;
   an oil sump adjacent said journal containing a lower body of oil in which said journal is at least partially submerged;
   an upper bearing rotationally supporting said upper shaft portion in said upper wall, said upper bearing including an outer race and an inner race separated by rotary bodies in an intervening annular gap; and
   an oil reservoir directly underneath said upper bearing containing an oil-saturated felt ring and communicating through a substantially vertical passage with said gap for conducting oil from said felt ring to said upper bearing, said felt ring lying just below said passage and extending radially beyond said outer race within said reservoir under a portion of said upper wall provided with a fill hole.
2. The drive defined in claim 1 wherein said passage contains a permeable substance facilitating the conduction of oil from said felt ring to said upper bearing.
3. The drive defined in claim 1 or 2 wherein said reservoir is an annular pan, of a diameter exceeding that of said outer race, surrounding said upper shaft portion.
4. The drive defined in claim 1 or 2, further comprising a sight glass connected to said sump for enabling the viewing of the oil level therein.
5. The drive defined in claim 1 or 2 wherein said spindle is surrounded by a vertically displaceable traveler ring.

* * * * *